United States Patent [19]

Chen

[11] Patent Number: 5,182,688
[45] Date of Patent: Jan. 26, 1993

[54] TAPE CASSETTE WINDER AND REWINDER

[75] Inventor: Tonny Chen, Changhua, Taiwan

[73] Assignee: E. Lead Electronic Co., Ltd., Taiwan

[21] Appl. No.: 617,745

[22] Filed: Nov. 26, 1990

[51] Int. Cl.$^5$ .............................................. G11B 5/08
[52] U.S. Cl. ........................................ 360/94; 242/197
[58] Field of Search .................... 360/94; 242/197–201

[56] References Cited

U.S. PATENT DOCUMENTS

| | | | |
|---|---|---|---|
| 4,479,618 | 10/1984 | Okada | 360/94 X |
| 4,947,270 | 8/1990 | Paynter | 242/197 |
| 4,972,278 | 11/1990 | Hara | 360/94 |

*Primary Examiner*—A. J. Heinz
*Attorney, Agent, or Firm*—Browdy and Neimark

[57] ABSTRACT

The invention is directed to a tape cassette winder/rewinder adapted to wind on rewinder a conventional VHS tape cassette or a compact VHS-C type cassette. This is achieved by providing a space to receive the conventional VHS tape cassette and a recess below this space to house retractable confining arms that extend to hold a VHS-C tape cassette. The recess also houses a retractable idle gear assembly which extends to drive the take up reel of the VHS-C cassette when it is being held by the confining arms.

8 Claims, 3 Drawing Sheets

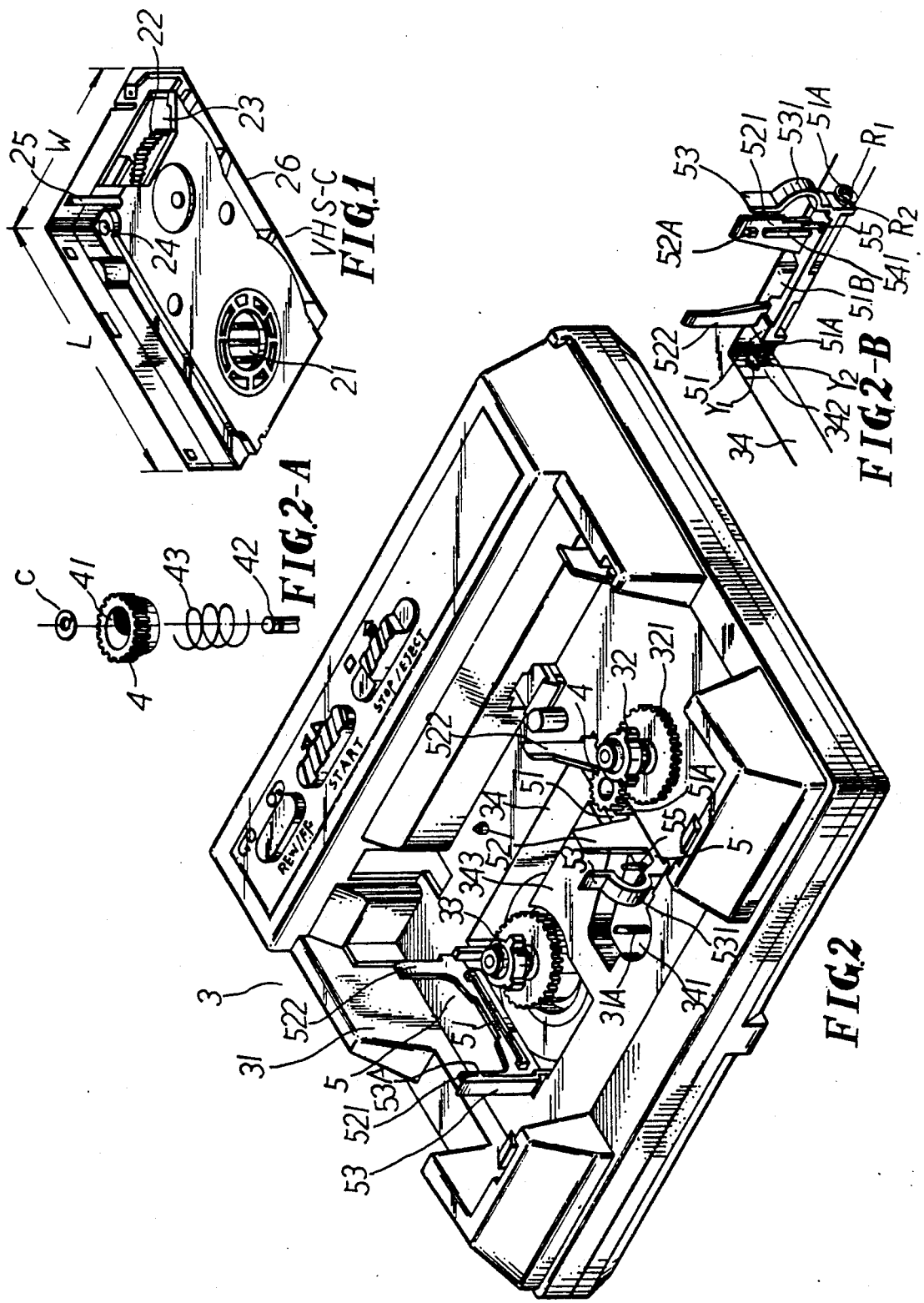

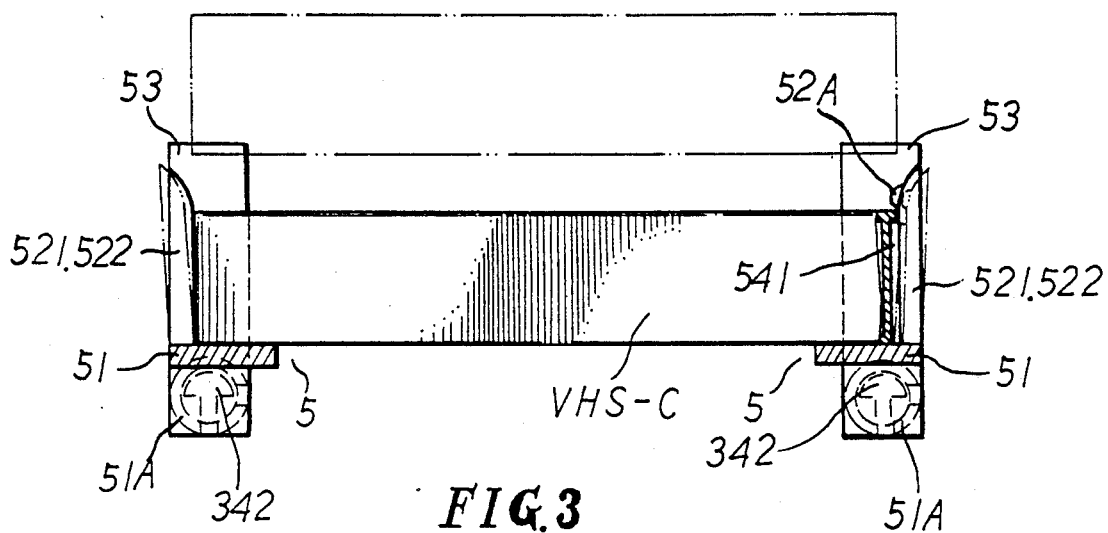
FIG. 3
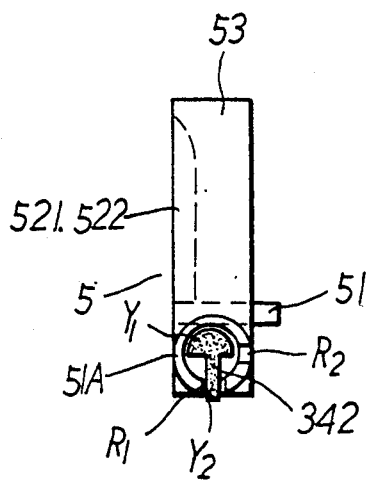
FIG. 4-A
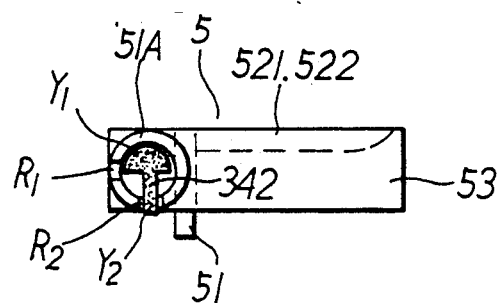
FIG. 4-B

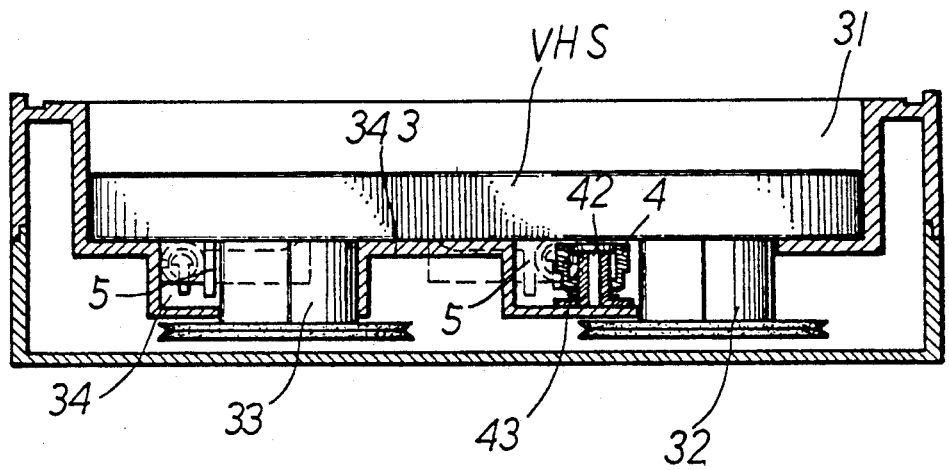
FIG.5-A
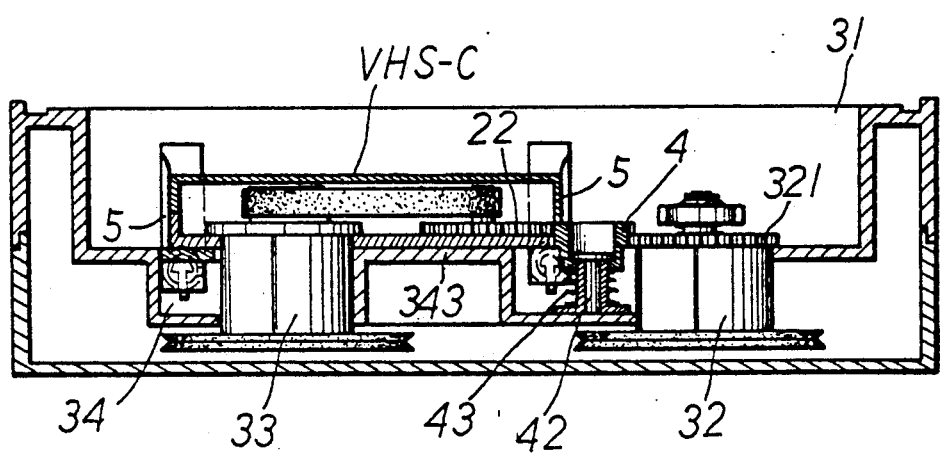
FIG.5-B

TAPE CASSETTE WINDER AND REWINDER

BACKGROUND OF THE INVENTION

This invention pertains to tape cassette winder/rewinders that accept magnetic tape cassettes for reproducing the information thereon.

Conventional devices of this kind are available to separately wind or rewind standard size VHS cassettes or compact VHS-C cassettes. However, a combination of VHS and VHS-C winder/rewinder has not yet been developed.

Therefore, it is the main object of the present invention to provide a tape cassette winder and rewinder which is suitable for use of both VHS and VHS-C tape cassettes in a single device.

SUMMARY OF THE INVENTION

The present invention relates to cassette winder/rewinder capable of winding or rewinding both VHS and VHS-C tape cassettes.

It utilizes a pair of confining means to be used with a VHS-C cassette, while also providing a standard VHS receiving space. The driving gear of VHS mechanism can be adapted to drive the take-up reel of VHS-C cassette via a idle gear assembly. To avoid interference, said confining means and idle gear assembly are depressed to be below a standard VHS cassette when operating.

BRIEF DESCRIPTION OF DRAWINGS

FIG. 1 is a perspective view of the compact VHS tape cassette;

FIG. 2 is a perspective view according to the present invention;

FIG. 2-A shows the idle gear assembly;

FIG. 2-B shows the front of the confining members;

FIG. 3 shows a VHS-C being confined;

FIG. 4-A shows the portion of the confining members when engaging a VHS-C cassette;

FIG. 4-B shows the position of the confining members when a standard VHS cassette is operated;

FIG. 5-A shows the operation of a VHS cassette; and

FIG. 5-B shows the operation of VHS-C cassette.

DESCRIPTION OF THE PREFERRED EMBODIMENT

With referring to the drawings, the cassette winder/rewinder according to the invention will be described in detail.

Referring to FIG. 1, a VHS-C compact cassette has a length L and width W respectively, which generally comprises releasing hole 24 to receive a pin-like member so that said pin-like member will inactivate a ratchet mechanism to release take-up reel 22.

Further referring to FIG. 2, a conventional VHS tape cassette winder/rewinder, in addition to the electrical circuit, generally comprises a cassette receiving space 31 to accommodate the disposition of standard VHS tape. A pair of rotating means 32, 33 is located at a substantially middle place to receive reels of the standard VHS cassette as shown in FIG. 5-A. Since this aspect of the cassette winder/rewinder is conventional it will not be discussed further.

Turning now to the discussion of the modified cassette winder/rewinder according to the present invention, also shown in FIG. 2, a VHS-C cassette having a supply reel 21 can be driven by rotating means 33 and with the help of a idle gear 4, the take-up reel 22 of the cassette can be driven by gear 321 of rotating means 32.

It is noted that idle gear 4 can be depressed into a recess to avoid interferences with use of a standard VHS cassette. This will be further discussed below.

Referring to FIG. 2-A, idle gear 4 has a recess 41 to allow insertion of clip C. A pole 42 to the winder/rewinder has a groove at upper end thereof engaged to clip C through a hole in idle gear 4. Spring 43 is provided as a restoring force, such that said idle gear can be depressed to disconnect with gear 321 when using a standard VHS cassette.

When not depressed, gear 321 engages rotating means 32 to drive idle gear 4. This permits take-up reel (gear) 22 to be driven by idle gear 4 via opening 23 during operation of a VHS-C cassette.

As further illustrated in FIG. 2 and FIG. 5-B standard cassette receiving space 31 further has recess 34 to allow disposition of a pair of confining means 5. Confining means 5 are spaced apart and substantially confine VHS-C cassette tape. Confining means 5 (see FIG. 5-B) comprises left and right plate members 51 having a pair of horns 521,522 integrally formed on each plate member 51.A protrusion 52A is formed on horn 521 to adequately hold the VHS-C cassette. Left confining plate 53 is formed integrally on plate member 51 with a protrusion 53A to facilitate the positioning of VHS-C cassette. Right confining plate 53 is formed integrally on right plate member 51, having a curved portion 531 to avoid contacting with pin 55 used to activate a standard VHS cassette and pin 31A formed on recess 34 used to activate a VHS-C cassette. Curved portion 531 can be disposed in respective curved portion 341. Rib 541 is formed on the inner face of horn 52 to substantially guide positioning reinforcement 25 of a VHS-C cassette.

As best shown in FIGS. 4A and 4-B, plate members 51 are rotatively connected via pivot-like member 342 enclosed by ring member 51A having openings R1 and R2 formed integrally 90 degrees apart so that head portion Y1 of pivot Y2 can be selectively received by openings alternatively as desired to facilitate closing and opening of confining member 5.

It is pointed out that the plate member 51 having a middle portion 51B being substantially lower than or disposed below idle gear 4 to avoid interference or interruption during operation. Still it is pointed out that a supporting member 343 is formed between the two reels of a cassette which is to provide a lateral support within recess 34.

FIG. 5-A and B show the operation of the two modes discussed. For standard VHS operation, with reference to FIG. 5-A, confining means 5 are closed and disposed into recess 34 so that the standard cassette can be inserted in a conventional manner. Idle gear 4, at this point, referring to FIG. 5-B, the VHS-C cassette is now positioned and confined by confining means 5 while idle gear 4 popping out by means of spring 43, so that said idle gear is engaged with driving gear 321 to resume rotating. Pin 31A is used to release the ratchet mechanism in a conventional manner.

An arrangement is described immediate above, therefore can perform the objectives set forth before.

I claim:

1. A tape cassette winder and rewinder suitable for selectively operating either a standard VHS or a compact VHS-C tape cassette, said tape winder and rewinder comprising:
- a housing;
- an upper portion of said housing having a volume corresponding to the volume of a standard VHS tape cassette;
- a pair of rotating means in said upper portion of said housing for engaging and driving the reels of a standard VHS type cassette;
- a recess in said housing below and communicating with said upper portion;
- a pair of pivoting confining members housed within said recess during operation of a standard VHS tape cassette;
- a pair of horns and each of said pair of pivoting confining members extending into said upper portion from a base plate in said recess for engagement with a compact VHS-C tape cassette during operation;
- a spring returned idle gear assembly rotatably engaged to a reel drive of one of said rotating means and to the pick-up reel of a compact VHS-C tape cassette by return of a spring during operation of the cassette; and
- said spring returned idle gear assembly compressed within said recess out of engagement with said reel drive by a standard VHS tape cassette during operation of the cassette.

2. A tape cassette winder and rewinder according to claim 1 wherein:
- said base plate rotates 90° within recess;
- coaxial rings integrally fixed on opposite ends of each said base plate;
- a pair of notches spaced 90° apart on each of said coaxial rings;
- two pairs of projections integrally fixed in said recess;
- each pair of said two pairs of projections respectively engaged in said coaxial rings;
- stop flange means on each projection of said two pairs of projections for alternatively engaging one of said pair of notches and alternatively fixing said each said base plate in one of two selected positions.

3. A tape cassette winder and rewinder according to claim 1, wherein at least one horn of said pair of horns has a projection integrally fixed on an inner face a distance from an upper surface of said base plate greater than the width of a compact VHS-C tape cassette.

4. A tape cassette winder and rewinder according to claim 1, wherein one of said pair of horns has a rib integrally fixed on an inner face to guide the positioning a compact VHS-C cassette between said pair of pivoting confining members.

5. A tape cassette winder and rewinder according to claim 1, wherein a pin is located in said recess corresponding to an access hole having the release ratchet of a reel of a compact VHS-C cassette.

6. A tape cassette winder and rewinder according to claim 5, wherein one of said pair of pivoting confining members has a curved portion spaced from said pin in said recess to activate a compact VHS cassette and a pin in said upper portion to activate a VHS cassette.

7. A tape cassette winder and rewinder according to claim 6, wherein said recess has an opening to receive said curved portion.

8. A tape cassette winder and rewinder according to claim 1, wherein a support is provided between said pair of rotating means to provide support for either a VHS cassette or a compact VHS-C cassette.

* * * * *